J. L. KNOX.
ANT TRAP.
APPLICATION FILED MAY 17, 1911.
1,002,919.
Patented Sept. 12, 1911.
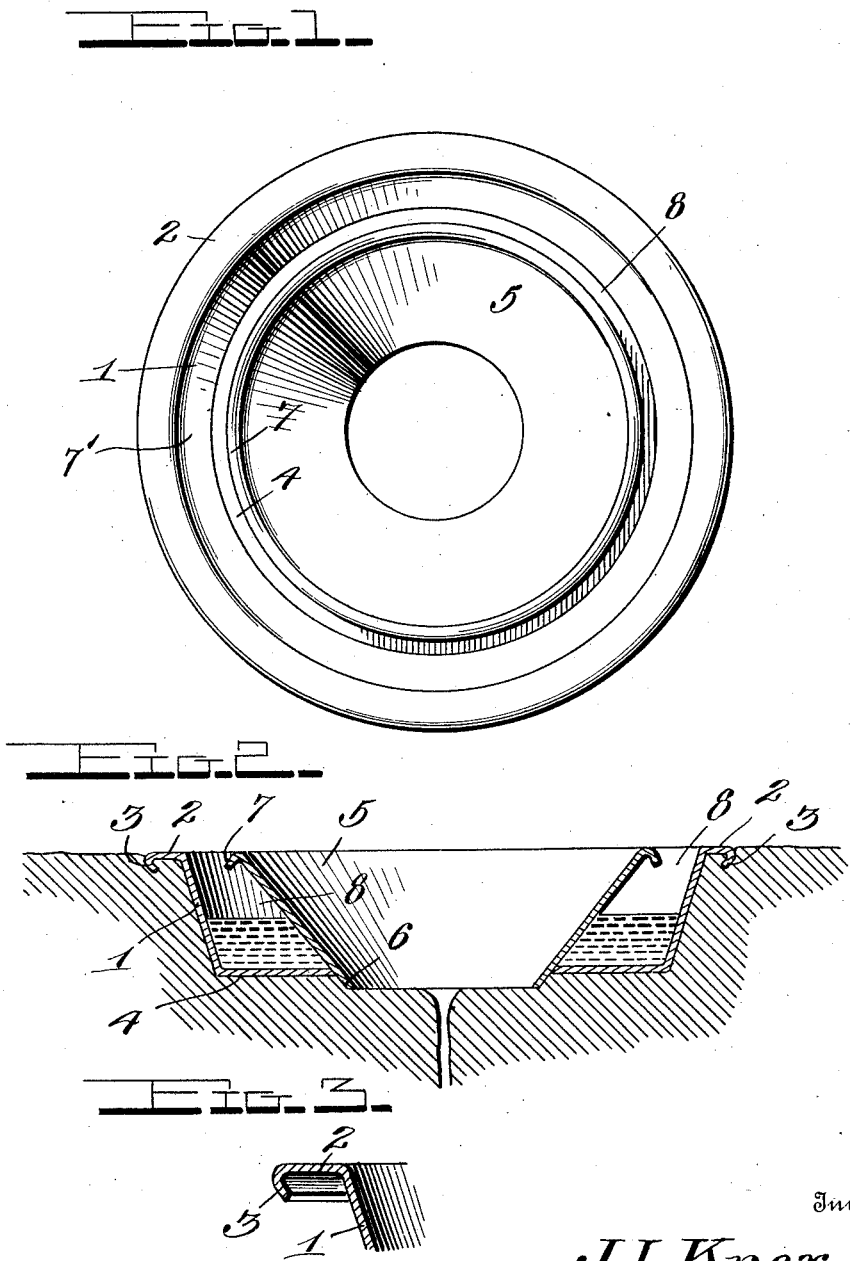
Witnesses
Chas. L. Griesbauer.
L. G. Ellis.
Inventor
J. L. Knox,
By Watson E. Coleman.
Attorney
COLUMBIA PLANOGRAPH CO., WASHINGTON, D. C.

UNITED STATES PATENT OFFICE.

JESSIE LONZO KNOX, OF TOLAR, TEXAS.

ANT-TRAP.

1,002,919.   Specification of Letters Patent.   Patented Sept. 12, 1911.

Application filed May 17, 1911.   Serial No. 627,782.

*To all whom it may concern:*

Be it known that I, JESSIE L. KNOX, a citizen of the United States, residing at Tolar, in the county of Hood and State of Texas, have invented certain new and useful Improvements in Ant-Traps, of which the following is a specification, reference being had to the accompanying drawings.

This invention relates to improvements in ant traps, and has for its object to exterminate ants, and insects of the like nature by catching them, and inclosing them in a compartment where they can be easily destroyed, by the use of water, oil or something of the like nature.

Another object of my invention is to provide means in this trap, whereby the ants will be prevented from escaping along the sides of it, that is, they will be diverted directly into the trap by having means whereby the ants will be prevented from escaping.

A further object of my invention is to arrange my trap so that it can be easily and cheaply manufactured.

Another object of my invention is to provide means whereby the trap will rest on the earth where the ants congregate, and have parts of it so arranged that the trap will be kept securely in position, and at the same time so arranged that ants coming toward the ant hill will be diverted directly into the trap.

Other objects of my invention will become apparent as it is more fully set forth.

There are many traps that have been constructed and designed for catching ants and insects of a like nature, but the same have the defect, that when they were installed or inserted in the ground that they do not prevent the ants from escaping along the outer sides of the trap. It is, of course, well known that the earth around a trap settles, and this permits a small space to be left between the outer sides of the trap and the earth, which the insects readily make use of as a means of escape, and increase the distance by burrowing in their usual manner. In this invention there is provided certain extensions on the edges of this trap whereby the ants will be prevented to a great extent from escaping, even when the earth is settled, as it tends to do after the trap has been inserted in the ground, which means will be fully described in a later part of the specifications.

In the accompanying drawings which illustrate by way of example an embodiment of this invention, Figure 1 represents a plan view of a trap embodying this invention, Fig. 2 represents a sectional elevation of the trap; Fig. 3 is a detail of the upper edge of the trap.

Similar reference characters refer to similar parts throughout the drawings.

In the drawings which illustrate the invention 1 represents the outer sides of a trap which has its upper end portion 2 flanged as it were, and which has its outer edge portion 3 hooked, or bent on itself, in order to prevent the insects from traveling along the bottom of the trap and escaping. With an edge turned downwardly as indicated, the ant has presented to him an impassable wall, which causes him to return to the ant hill, and generally causes him to try to escape by way of the trap, and thereby be caught. The bottom portion 4 of the trap is formed by turning the outer sides 1 inwardly as is clearly shown in the drawings, the bottom portion 4 is provided with a hole through which the insects tend to escape. Mounted on the inner portion of the trap is an inverted conical piece 5, which is connected in any suitable manner to the bottom portion 4 and is so arranged that its lower edge 6 projects beyond the bottom portion 4 of the outer side piece, as is clearly shown in the drawing. The upper edge 7 of this conical piece 5 is curved in order to prevent the insects from climbing up from the interior compartment 8, between the inner conical piece and the outer side piece and escaping from the trap.

When it is desired to use the trap, it is inserted in an ant hill or the like, and the dirt, or earth of the same, is compactly pressed around the trap, as is clearly shown in the drawings, so that there is no means of escape for the insect except through the interior portion 7' of the trap, because the conical piece has its lower edge 6 projecting into the earth of the ant hill, in such a way as to form the only way for them. When an ant tries to escape by climbing up the side of the conical piece 5, he must pass over the upper end edge 7, and into the inner compartment 8 of the trap and thereby be caught. This portion of the trap is preferably filled with water or oil.

Ants coming toward the trap walk along the upper edge 2 and slip over the side and into the trap, the outer side of the outside piece being preferably inwardly slanting as indicated. Under these circumstances the ants will be caught, whether trying to escape from the ant hill, or trying to enter the ant hill, in both cases the ants will fall into the inner compartment 8, and thereby be caught.

Should the ants try to escape via the outside edge of the trap, that is, along the outside of the bottom 4, and along the outer surface of the side 1, and thence to the flanged portion 2 and thence to the outside of the ground, they will be prevented from doing so, by the curved edge 3, which will preserve an impassable barrier for the insect, and thereby cause it to return to the ant hill, and find another way out. By having the lower edge 6 projecting beyond the bottom 4 of the trap, means are provided whereby under ordinary circumstances, the ant will be prevented from even trying to escape, by the way just described, and thereby forced to enter and be caught in the trap, that is, the trap is arranged so that ordinarily the insects cannot escape being caught in the trap by the projecting piece 7. Should this barrier, for any reason, not prove of avail, the second barrier, the curved edge 3 will prevent the escape of the ant, so that the trap forms a very positive means for catching insects of this nature.

While the trap is very efficient as a means for catching ants, it is by no means expensive to manufacture, and at the same time all its parts are readily accessible for inspection and repair, more particularly for cleaning, which thereby makes the trap very sanitary and desirable.

Obviously, while the trap is shown in one modification in the drawings, it is not desired to limit the invention, in any way, otherwise than necessitated by the prior art, as many modifications of construction of this invention may be made, without departing from the principles thereof.

Having thus described the invention it is claimed:

1. A trap for insects comprising in combination an outer casing having its upper side portion flanged, its upper and outer edge curved inwardly and its lower portion 4 bent inwardly to form a base for the trap, a quasi conical piece disposed within said outer piece and having its lower edge projecting beyond the bottom portion of said piece and having its upper edge turned downwardly in order to cause the insects to fall into the compartment between the conical piece and the outer sides of said outer piece.

2. An ant trap comprising in combination an outer casing formed from one piece of material having a flat bottom having a hole therein and upwardly inclined sides and its upper edge portion flanged outwardly with its outer edge curved downwardly and having its sides slantingly disposed, quasi conical formed casing secured to the said bottom and having its lower edge projecting therethrough, the upper edge portion of said conical casing being curved outwardly and downwardly in order to cause ants and the like that climb into the trap to fall into a compartment disposed between said conical piece and outer casing.

In testimony whereof I hereunto affix my signature in the presence of two witnesses.

JESSIE LONZO KNOX.

Witnesses:
S. M. HUPTEDLR,
G. L. BLANTON.

---

Copies of this patent may be obtained for five cents each, by addressing the "Commissioner of Patents, Washington, D. C."